(No Model.)

C. H. ADAMS.
BLINDER ATTACHMENT FOR BRIDLES.

No. 368,365. Patented Aug. 16, 1887.

WITNESSES:
John H. Reemer
C. Sedgwick

INVENTOR:
C. H. Adams
BY Munn & Co.
ATTORNEYS.

UNITED STATES PATENT OFFICE.

CHARLES H. ADAMS, OF NEW YORK, N. Y.

BLINDER ATTACHMENT FOR BRIDLES.

SPECIFICATION forming part of Letters Patent No. 368,365, dated August 16, 1887.

Application filed March 11, 1887. Serial No. 230,548. (No model.)

*To all whom it may concern:*

Be it known that I, CHARLES H. ADAMS, of the city, county, and State of New York, have invented a new and Improved Blinding Attachment for Bridles, of which the following is a full, clear, and exact description.

My invention relates to an improved blinding attachment for bridles, and has for its object to provide a device readily applicable to any bridle, whereby a horse may be effectually and quickly prevented from seeing, and the said device be operated from the saddle or vehicle drawn by the horse or horses, and wherein the obstruction may be as quickly and readily removed and the animal allowed the use of his eyes.

The invention consists in providing the blinds with pulleys and straps or cording attached to said blinds, passing through said pulleys, the said straps or cords being united over the neck and operated with the reins.

Reference is to be had to the accompanying drawings, forming a part of this specification, in which similar letters of reference indicate corresponding parts in both the figures.

Figure 1:
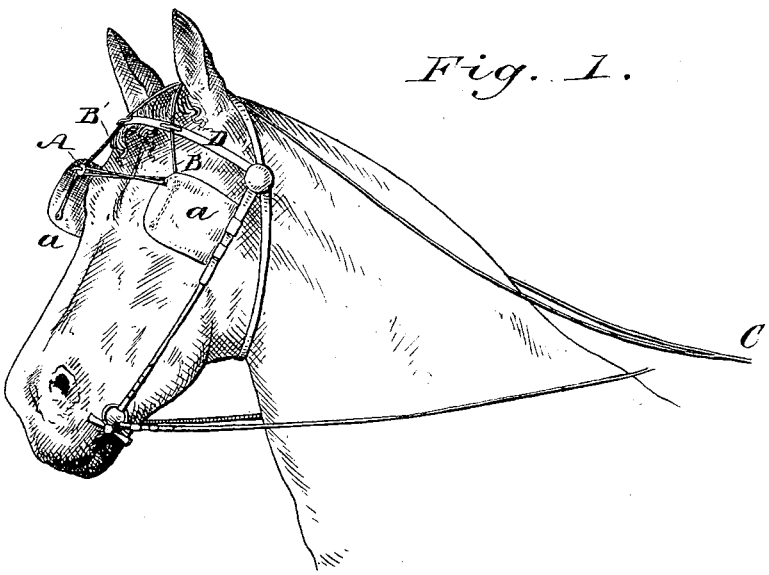
Figure 2:
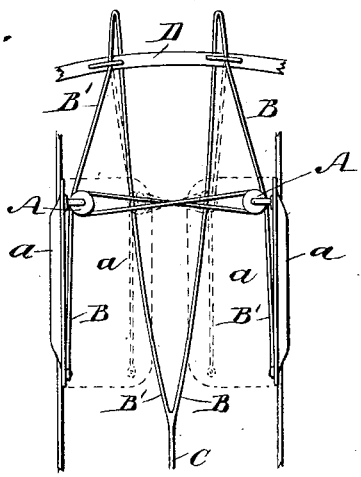

Figure 1 illustrates the application of the device to a bridle in position upon a horse's head; and Fig. 2, a front elevation of the device, illustrating in positive lines an open position of the blinds and in dotted lines the blinds as closed.

In carrying out the object of the invention, which is primarily to stop a runaway horse or team by depriving them of sight, small pulleys A are attached to the inner front edge of the blinds $a$ at or near the top, which pulleys may be secured in any approved or suitable manner.

In substantial alignment with the pulleys A, at or near the lower inner side of each blind, a cording, B B', of leather or equivalent material, is securely attached by rivets, sewing, or equivalent means, each of which cords is passed up over the pulley of the respective blind to which they are secured, and the said cording crossing centrally between the blinds is then passed over the pulleys of the opposing blinds and up through loops upon the head-strap D, between or at each side of the ears back over the neck, as shown in Fig. 1, where the two straps are merged in one. The single strap C of the attachment, if used upon a saddle-horse, is taken in hand with the bridle-rein, and if the said horse is attached to a vehicle the single strap is led back to the driver and held with the lines.

In operation, to stop or blind the animal, the line C is drawn, whereupon the cords B B', drawing toward the center, bring the inner edges of the blinds near together, as shown in dotted lines, Fig. 2, and also close down upon the animal's head, effectually blinding him. As soon as the cords are slackened the blinds or winkers return automatically to their normal position.

If found desirable, but one line may be employed, attached to one blind, and the said cords passed through both pulleys; but the construction shown is preferable.

The loops upon the head-strap D may be omitted without departing from the spirit of the invention, and the cords B B' be conducted either above or beneath the bridle-straps to the rear, either between or upon either side of the ears, as found most convenient.

Having thus described my invention, what I claim as new, and desire to secure by Letters Patent, is—

1. The combination, with the winkers or blinds of a bridle, of pulleys attached thereto, and cording also secured to the blinds, adapted to pass over said pulleys and over the neck, substantially as shown and described, and for operation as herein set forth.

2. The combination, with the winkers or blinds of a bridle, of pulleys attached at the upper inner ends, and cording secured below said pulleys, adapted to pass over the same, the said cords crossing between the blinds and over the neck, substantially as shown and described, and for the purpose herein set forth.

3. The combination, with the blinds or winkers $a$, having pulleys A attached to the upper inner sides, of cords B B', secured to the blinds below the pulleys, the said cords passing over the pulley immediately above it and crossing one another between the blinds over the opposing pulleys to rear, terminating in a single cord, C, substantially as shown and described, and for the purpose herein set forth.

CHARLES H. ADAMS.

Witnesses:
J. F. ACKER, Jr.,
E. M. CLARK.